United States Patent [19]

King et al.

[11] Patent Number: 5,696,209

[45] Date of Patent: Dec. 9, 1997

[54] DUAL-CURE FLOWABLE ADHESIVE

[75] Inventors: Russell Keith King; Chi-Long Lee, both of Midland, Mich.

[73] Assignee: Dow Corning Corporation, Midland, Mich.

[21] Appl. No.: 723,460

[22] Filed: Oct. 9, 1996

[51] Int. Cl.⁶ .................................. C08F 283/00
[52] U.S. Cl. .................. 525/478; 525/477; 528/15; 528/17; 528/18; 528/21
[58] Field of Search ..................... 528/15, 17, 18, 528/21; 525/478, 477

[56] References Cited

U.S. PATENT DOCUMENTS

| 4,774,297 | 9/1988 | Murakami et al. | 525/478 |
| 4,988,779 | 1/1991 | Medford et al. | 525/478 |
| 5,169,727 | 12/1992 | Boardman | 428/447 |
| 5,208,300 | 5/1993 | Krahnke et al. | 525/474 |
| 5,210,156 | 5/1993 | Clark et al. | 525/477 |
| 5,292,586 | 3/1994 | Lin et al. | 428/355 |
| 5,399,614 | 3/1995 | Lin et al. | 528/15 |
| 5,416,144 | 5/1995 | Stein et al. | 525/478 |
| 5,473,026 | 12/1995 | Strong et al. | 525/477 |
| 5,475,044 | 12/1995 | Stein | 525/478 |

FOREIGN PATENT DOCUMENTS

0664328 A1 1/1995 European Pat. Off. ........ C09J 183/07

*Primary Examiner*—Melvyn Marquis
*Attorney, Agent, or Firm*—Sharon K. Severance

[57] ABSTRACT

The invention pertains to an dual-cure silicone adhesive composition that is extrudable and flowable at room temperature in the absence of a solvent comprising (A) 40 to 95 parts of an alkenyl functional siloxane resin said resin containing 0.01 to 22 wt% alkenyl functionality; (B) 0.5 to 20 parts of a SiH containing polyorganosiloxane having an average of at least 1.7 silicon-bonded hydrogen atoms per molecule and having a viscosity of 0.8 to 2,000 mm²/s; (C) a silane represented by monomers of the formula $R^1_{4-y}Si(OR^2)_y$ or oligomeric reaction products thereof; (D) a hydrosilylation catalyst in sufficient quantity to promote curing of said composition; (E) a moisture curing catalyst to promote the moisture initiated reaction of the alkoxy radicals; (F) optionally, 0.1 to 70 parts of a polydiorganosiloxane having at least two ethylenically or acetylenicaly unsaturated groups per molecule and having a viscosity of 100 to 80,000 mm²/s; and (G) optionally, an inhibitor in sufficient quantity for the composition to be stable at room temperature;

wherein at least one of said resin (A), SiH containing polyorganosiloxane (B) and/or optional polydiorganosiloxane (F) contain a curing radical of the formula $-ZSiR^1_x(OR^2)_{3-x}$

24 Claims, No Drawings

DUAL-CURE FLOWABLE ADHESIVE

BACKGROUND OF THE INVENTION

This invention relates to a solventless dual-cure silicone adhesive composition that is flowable or extrudable at room temperature. The composition first cures primarily through an addition reaction to a viscous, tacky state which has a high green strength but still allows adjustment or replacement of the adherands (i.e. a pressure sensitive adhesive), and thereafter slowly cures via a condensation reaction (moisture cure) to yield a high strength, immovable bond (i.e. a permanent adhesive).

Various addition curable adhesives are known in the art. Some of these adhesives require the use of a solvent for application to a substrate since they are not flowable or extendable at room temperature. For Example, U.S. Pat. No. 4,774,297 to Murakami et al. discloses an addition curable pressure sensitive adhesive forming composition. Upon completion of the initial addition cure these pressure sensitive adhesives do not further cure to a permanent adhesive.

Addition-curable silicone pressure sensitive adhesive compositions that do not require the use of solvent for application to a substrate are also known in the art. However, these compositions do not provide the dual cure that is found in the compositions of the instant application. For example, U.S. Pat. No. 4,988,779 to Medford et al., U.S. Pat. No. 5,169,727, U.S. Pat. No. 5,292,586 to Lin et al. disclose an addition curable silicone pressure sensitive adhesive composition.

Various moisture curable silicone pressure sensitive adhesives are also known in the art. However, as with the addition-curable pressure sensitive adhesives these compositions do not undergo the dual cure that is provided by the compositions of the instant invention. For example, U.S. Pat. No. 5,210,156 to Clark et al., and U.S. Pat. No. 5,208,300 to Krahnke et al. disclose silicone pressure sensitive adhesives that cure in the presence of moisture.

EP Patent Application 0 664 328 to Mealy et al. discloses a dual cure silicone pressure sensitive adhesive composition comprising (a) a capped organopolysiloxane MQ resin containing less than 1 wt % silicon-bonded hydroxyl groups; (b) an alkenyl functional polydiorganosiloxane having a viscosity of 10,000 to 10,000,000 cp; (c) an SiH containing polyorganosiloxane; (d) an alkenetrialkoxysilane; (e) a platinum containing catalyst; and (f) a moisture curing catalyst. EP 0 664 328 requires the use of a solvent for application of the silicone pressure sensitive adhesive to the substrate and does not teach the use of functional resins in the compositions.

Finally, U.S. Pat. No. 5,473,026 to Strong et al. describes a moisture curable hot-melt silicone pressure sensitive adhesive compositions comprising an alkoxy functional resin, a hydrolyzable group containing polydiorganosiloxane and a curing catalyst. However, these compositions require heat to deliver and are hard at room temperature.

It is an object of this invention to provide a room temperature flowable, solventless, curable silicone adhesive composition that first cures to a viscous, tacky state which has a high green strength but still allows adjustment or replacement of the adherands (i.e. a pressure sensitive adhesive), and thereafter slowly cures to yield a high strength, immovable bond (i.e. a permanent adhesive).

SUMMARY OF THE INVENTION

This invention pertains to a dual-cure silicone adhesive composition that is extrudable and flowable at room temperature in the absence of a solvent. The compositions quickly cure to a viscous, tacky state which have a high green strength but still allow adjustment or replacement of the adherands (i.e. a pressure sensitive adhesive), and thereafter slowly cure to yield a high strength, immovable bond (i.e. a permanent adhesive). The solventless, dual-curable adhesive compositions comprise a mixture of (A) 40 to 95 parts of an alkenyl functional siloxane resin consisting essentially of $R_3SiO_{1/2}$ siloxane units (M units) and $SiO_{4/2}$ siloxane units (Q units) wherein each R is independently a monovalent hydrocarbon radical having 1 to 6 carbon atoms with the provision that at least one R is an alkenyl radical; there being from 0.5 to 1.5 $R_3SiO_{1/2}$ units for every $SiO_{4/2}$ units; said resin containing 0.01 to 22 wt % alkenyl functionality;

(B) 0.5 to 20 parts of a SiH containing polyorganosiloxane having an average of at least 1.7 silicon-bonded hydrogen atoms per molecule and having a viscosity of 0.8 to 2,000 $mm^2/s$;

(C) a silane represented by monomers of the formula $R^1_{4-y}Si(OR^2)_y$, or oligomeric reaction products of partial hydrolysis and condensation thereof, in which $R^1$ is selected from the group consisting of alkyl radicals having 1–6 carbon atoms and aryl radicals having 6–10 carbon atoms, $R^2$ is selected from the group consisting of an alkyl radical having 1 to 3 carbon atoms and an alkoxyalkyl radical; and y is 2 to 4;

(D) a hydrosilylation catalyst in sufficient quantity to promote curing of said composition;

(E) a moisture curing catalyst to promote the moisture initiated reaction of the alkoxy radicals (F) optionally, 0.1 to 70 parts of a polydiorganosiloxane having at least two ethylenically or acetylenicaly unsaturated groups per molecule and having a viscosity of 100 to 80,000 $mm^2/s$; and (G) optionally, an inhibitor in sufficient quantity for the composition to be stable at room temperature;

wherein at least one of said resin (A), SiH containing polyorganosiloxane (B) and optional polydiorganosiloxane (F) contain a curing radical of the formula $—ZSiR^1_x(OR^2)_{3-x}$; wherein $R^1$ is as described previously; $R^2$ is selected from the group consisting of an alkyl radical having 1 to 3 carbon atoms and an alkoxyalkyl radical; Z is a divalent linking radical; and the x has a value of 0 or 1;

wherein said adhesive composition has a viscosity of between 5 and 1,500 Pa's and is flowable or extrudable 25° C. in the absence of solvent; and wherein said adhesive composition first cures to a composition having green strength and a movable bond and thereafter further cures to a composition having an immovable bond.

THE INVENTION

This invention pertains to a solventless dual cure, room temperature extendable or flowable adhesive composition. The adhesive composition first cures to an adhesive composition that exhibits a high green strength and provides for a movable bond. The adhesive composition further cures to an adhesive that has an immovable bond. The compositions comprise a mixture of (A) 40 to 95 parts of an alkenyl functional siloxane resin containing 0.01 to 22 wt % alkenyl functionality; (B) 0.5 to 20 parts of a SiH containing polyorganosiloxane having a viscosity of 0.8 to 2,000 $mm^2/s$; (C) a silane represented by monomers of the formula $R^1_{4-y}Si(OR^2)_y$, or oligomeric reaction products thereof; (D) a hydrosilylation catalyst; (E) a moisture curing catalyst (F) optionally, 0.1 to 70 parts of a polydiorganosiloxane having at least two ethylenically or acetylenicaly unsaturated groups per molecule and having a viscosity of 100 to 80,000 mm²/s; and (G) optionally, an inhibitor; wherein at least one of said resin (A), SiH containing polyorganosiloxane (B) and optional polydiorganosiloxane (F) contain a curing radical of the formula —ZSiR$^1_x$(OR$^2$)$_{3-x}$; wherein R$^1$ is as described previously; R$^2$ is selected from the group consisting of an alkyl radical having from 1 to 3 carbon atoms and an alkoxyalkyl radical; Z is a divalent linking radical; and the x has a value of 0 or 1.

By the term "mixture" it is meant any blend or incipient reaction product of the listed components. Thus, upon combination with each other the components may remain in their form as added or they may incidentally react with another component to form a component not specifically identified in the listing.

The first cure to the movable bond occurs primarily through an addition reaction between components (A), (B) and optionally (F) catalyzed by (D). The second cure to the immovable bond occurs primarily through a condensation reaction between component (C) and the moisture curing radical —ZSiR$_x$(OR$^2$)$_{3-x}$ catalyzed by component (E).

Component (A) is an alkenyl functional siloxane resin that consists essentially of R$_3$SiO$_{1/2}$ siloxane units (M units) and SiO$_{4/2}$ siloxane units (Q units); where R is selected from the group consisting of a monovalent hydrocarbon group having 1 to 6 carbon atoms and the group —ZSiR$_x$(OR$^2$)$_{3-x}$. In addition to the R$_3$SiO$_{1/2}$ siloxane units and SiO$_{4/2}$ siloxane units the resins may contain HOR$_2$SiO$_{1/2}$ units and even some divalent and trivalent siloxane units, provided however, that these units are present only in small amounts. It is preferable that the resin consist essentially of R$_3$SiO$_{1/2}$ siloxane units and SiO$_{4/2}$ siloxane units.

R may be exemplified by alkyl radicals such as methyl or ethyl; the phenyl radical; and alkenyl radicals such as vinyl, allyl and hexenyl. Preferably R is selected from the group consisting of methyl and vinyl.

The siloxane resins typically contain 0.01 to 22 wt % alkenyl functionality, preferably 0.6 to 20 wt % alkenyl functionality, most preferably 0.6 to 8 wt %.

The mole ratio of the R$_3$SiO$_2$ siloxane units to SiO$_{4/2}$ siloxane units in the resin has a value of from 0.5/1 to 1.5/1, preferably from 0.6/1 to 1.1/1. These mole ratios are easily measured by $^{29}$Si NMR. spectroscopy. It is preferable that the presence of silicon-bonded hydroxyl groups (i.e. HOR$_2$SiO$_{1/2}$ or HOSiO$_{3/2}$ groups) is kept below 0.7% by weight of the total weight of the resin, preferably below 0.3%.

The siloxane resins can be dissolved, substantially completely, in either a hydrocarbon liquid such as benzene, toluene, xylene, heptane and the like or in a silicone liquid such as a low viscosity cyclic or linear polydiorganosiloxanes.

Alkenyl functional siloxane resins are well known in the art and can be prepared by known methods.

Component (B) is a SiH containing polyorganosiloxane having an average of at least 2 silicon-bonded hydrogen atoms per molecule and having a viscosity of 0.8 to 2,000 mm²/s, preferably 2 to 200 mm²/s.

The organic groups on the silicon are selected from the group consisting of alkyl radicals having 1 to 4 carbon atoms and aryl radicals having from 6 to 10 carbon atoms. The organic groups may be exemplified by methyl, ethyl, and phenyl. Typically the SiH containing polyorganosiloxane contains from 0.01 to 2 wt % of hydrogen bonded to silicon, preferably from 0.1 to 1.7 wt %.

The amount of component (B) present in the adhesive composition is sufficient to provide from 1 to 30 silicon bonded hydrogen atoms for every olefinically unsaturated radical in the total of (A) plus (F). Preferably there are from 1 to 10 silicon bonded hydrogen atoms for every olefinically unsaturated radical. Typically this requires 0.5 to 20 parts of the component (B) in the composition.

Component (B), may be exemplified by, but not limited to polymethylhydrogensiloxanes, linear polymethylhydrogensiloxanes, branched polymethylhydrogensiloxanes, polydimethylmethylhydrogensiloxane copolymers, polymethylhydrogencyclosiloxanes and polydimethylmetmethylhydrogencyclosiloxanes; resins comprised of SiO$_{4/2}$ units, (CH$_3$)$_3$SiO$_{1/2}$ units and units of (CH$_3$)$_2$HSiO$_{1/2}$, CH$_3$HSiO$_{2/2}$ and (CH$_3$)$_2$SiO$_{2/2}$, etc.; and mixtures thereof. The silicon-bonded hydrogen groups may be pendent and/or terminal.

Component (B) may be further exemplified by compounds having the formulas

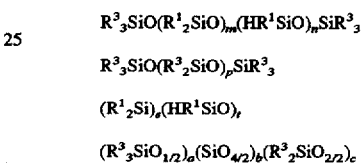

wherein each R$^1$ individually is a radical selected from the group consisting of alkyl radicals having from 1 to 6 carbon atoms and aryl radicals having from 6 to 10 carbons atoms; R$^3$ is selected from the group consisting of the hydrogen atom and R$^1$ with the proviso that at least 1.7 R$^3$ groups are hydrogen atoms. R$^1$ may be exemplified by, but not limited to, methyl, ethyl, propyl, phenyl, and others. Subscripts m, n, p, s, t, a, b, and c are such that the viscosity is from 0.8 to 2,000 mm²/s and that, individually, n, p, t and a+c are ≧1.7. It is preferable that the SiH containing polyorganosiloxane have a viscosity of from 2 to 200 mm²/s.

Component (C) is alkoxysilane or oligomeric reaction product thereof. The silanes have the formula R$^1_{4-y}$Si(OR$^2$)$_y$ in which R$^1$ is selected from the group consisting of alkyl radicals having 1–6 carbon atoms and aryl radicals having 6–10 carbon atoms. R$^2$ is selected from the group consisting of an alkyl radical having 1 to 3 carbon atoms and an alkoxyalkyl radical; and y is 2 to 4. R$^2$ may be exemplified by, but not limited to methyl, ethyl, propyl, and others. By oligomeric reaction product thereof it is meant a low molecular weight product derived from the partial hydrolysis/condenation of alkoxysilanes.

Alkoxysilanes (C) may be exemplified by, methyltrimethoxysilane, dimethyldimethoxysilane, methyltriethoxysilane, ethyltrimethoxysilane and others.

Component (D) is a hydrosilylation catalyst. The hydrosilylation catalysts may be any of those catalysts known in the art that are effective for catalyzing the reaction between silicon bonded hydrogen atoms with silicon bonded unsaturated carbon groups (i.e. C=C groups). Such catalysts typically include, but are not limited to, metal catalysts wherein the metal is selected from the group consisting of ruthenium, rhodium, palladium, osmium, iridium and platinum. Preferably, the hydrosilylation catalyst is a platinum-containing catalyst. Suitable platinum containing catalysts are well known in the art and may be exemplified by, but not limited to, platinum metal, platinum compounds, and platinum complexes. The platinum compounds and platinum complexes may be exemplified by chloroplatinic acid, chloroplatinic acid hexahydrate, Karstedt's catalyst, dichloro-bis (triphenylphosphine)platinum (II), cis-dichloro-bis (acetonitrile)platinum(II), dicarbonyldichloro-platinum(II), platinum chloride, platinum oxide and others. Any platinum containing material which effects the reaction between the silicon hydride and the unsaturated portion of the unsaturated compound is useful.

The platinum containing catalyst is present in an amount sufficient to provide at least 0.1 to 1,000; preferably 1 to 500; most preferably 10 to 300 parts by weight of platinum for every one million parts by weight of the combined weight of (A), (B) and (F).

Component (E) is a moisture curing catalyst to promote the moisture initiated reaction of the alkoxy radicals. Any catalyst known in the art suitable for promoting the moisture initiate reaction can be used. Suitable catalysts include, but are not limited to metal salts of monocarboxylic acids, such as stannous octoate, dibutyltin dilaurate, and dibutyltin diacetate; titanium esters such as tetrabutyl titanate, tetraethylhexyl titanate and tetraphenyltitanate; siloxytitanates, such as tetrakis(trimethylsiloxy)titanium and bis (trimethylsiloxy)bis(isopropoxy)titanium; and betadicarbonyltitanium compounds, such as bis(acetylacetonyl) diisopropyl titanate; amines, such as hexylamine and their acetate and quat salts. Preferred catalysts include titanium diisopropoxydiethylacetoacetate and tetrabutyltitanate.

Component (E) is present in an amount suitable to promote the moisture-initiated reaction of the alkoxy radicals. Typically component (E) is present from 0.5 to 10 wt % based on the amount of components ((A)/(B)/(F) and (C). Preferably, component (E) is employed at about 1 wt % based on the amount of adhesive composition.

Component (F) is an optional component. Component (F) is an alkenyl functional polydiorganosiloxane having the general formula $R^1_2R^4SiO(R^4_2SiO)_kSiR^4R^1_2$ wherein each $R^1$ is as described above; each $R^4$ individually is selected from the group consisting of an alkenyl radical, an alkynyl radical and $R^1$ with the proviso that at least two $R^4$ radicals per molecule must be alkenyl or alkynyl; and k has a value such that the viscosity of (F) is from 100 to 80,000 mm²/s at 25° C., preferably from 9,000 to 55,000 mm²/s. Preferably at least 50%, and more preferably 90%, of all $R^1$ and $R^4$ groups should be methyl.

$R^4$ may be exemplified by, but not limited to, alkyl groups such as methyl, ethyl, propyl; aryl groups such as phenyl; alkenyl groups such as vinyl, allyl, butenyl, hexenyl; and others. Preferably $R^4$ is vinyl when $R^4$ is an alkenyl group.

Component (F) may be comprised of a single polydiorganosiloxane, a mixture of two or more polydiorganosiloxanes that meet the above formula, or a mixture of polydiorganosiloxanes wherein at least one meets the above formula for component (F).

The alkenyl functional polydiorganosiloxane (F) may be exemplified by, but not limited to, ViMe₂SiO(Me₂SiO)$_e$SiMe₂Vi, ViMe₂SiO(Me₂SiO)$_e$(MePhSiO)$_f$SiMe₂Vi, ViMe₂SiO(Me₂SiO)$_e$(MeViSiO)$_g$SiMe₂Vi, Me₃SiO (Me₂SiO)$_e$(MeViSiO)$_g$SiMe₃, PhMeViSiO(Me₂SiO)$_e$ SiPhMeVi, and others where Me, Vi, and Ph denote methyl, vinyl and phenyl respectively and e, f and g are such that the polymer has a viscosity of from 100 to 80,000 mm²/s. The alkenyl functional polydiorganosiloxane (F) typically contains from 0.01 to 15 wt % vinyl bonded to silicon, preferably from 0.05 to 0.5 wt % vinyl bonded to silicon.

Typically there is from 0.1 to 70 parts of the alkenyl functional polydiorganosiloxane present in the composition, preferably from 1 to 50 parts, more preferably from 8 to 40 parts.

Component (G) is optional in the adhesive composition. Component (G) inhibits or reduces the catalytic activity of the hydrosilylation catalyst (D) at room temperature. Useful inhibitors include, but are not limited to, organophosphorus compounds such as triphenylphosphine; nitrogenous compounds such as tributylamine, tetramethylethylenediamine and benzotriazole; sulfur-containing compounds; acetylenic compounds; compounds bearing at least two alkenyl groups; hydroperoxy compounds; and maleic acid derivatives.

Preferred catalyst inhibitors include phosphines, phosphites, and phosphine oxides such as triphenylphosphine, trioctylphosphine, divinylphenylphosphine, tributylphosphine oxide, trioctylphosphine oxide and triphenylphosphine oxide which inhibit the catalytic activity of the hydrosilylation catalyst (D) at room temperature in the absence of oxygen and SiH-reactive hydroxylated compounds. These inhibitors are taught in U.S. Pat. No. 5,308,812, herein incorporated by reference for its teaching of these inhibitors.

The amount of inhibitor used is dependent on a number of factors including, but not limited to, the activity of the inhibitor and the activity of hydrosilylation catalyst (D). Typically the molar ratio of catalyst inhibitor to metal present in hydrosilylation catalyst (D) is within the range of from 1:1 to 200:1.

In order for the composition to achieve the dual cure capability at least one of said resin (A), SiH containing polyorganosiloxane (B) and polydiorganosiloxane (F) should contain a curing radical of the formula —$ZSiR^1_x$ $(OR^2)_{3-x}$; wherein $R^1$ and $R^2$ are as described previously; Z is a divalent linking radical; and the x has a value of 0 or 1. Preferably the curing radical is present on the resin (A).

Z denotes any divalent radical which durably links the silicone atom of the curing radical to a silicon atom of the resin (A), SiH containing polyorganosiloxane (B) or polydiorganosiloxane (F) so that the curing radical is not removed from the component during the moisture-curing reaction. Further, Z should not adversely limit or affect the moisture-curing or addition curing reactions. Z is typically selected from the types of divalent radicals that are used to link silicon atoms in a hydrolytically stable manner and include, for example, oxygen; hydrocarbon such as alkylene (ethylene, propylene, and isobutylene) and phenylene; siloxane; and combinations thereof. Z may be exemplified by, but not limited to, —O—, —OSi(CH₃)₂)O—, —CH₂CH₂—, —(OSi(CH₃)₂)CH₂CH₂— and others.

Specific examples of curing radicals include, but are not limited to, (CH₃O)₃SiCH₂CH₂—, (CH₃O)₃SiO—, CH₃ (CH₃O)₂SiO—, (CH₃O)₃SiCH₂CH₂Si(CH₃)₂CH₂CH₂Si (CH₃)₂O—, (CH₃O)₃SiCH₂CH₂Si(CH₃)₂O—, (CH₃O)₃ SiCH₂CH₂Si(CH₃)₂OSi(CH₃)₂O—, and (CH₃O)₃ SiCH₂CH₂Si(CH₃)₂OSi(CH₃)₂CH₂CH₂—.

Methods for producing alkoxy functional resins (a), alkoxy functional SiH containing polyorganosiloxanes (B) and alkoxy functional polydiorganosiloxanes (F) are known in the art.

In addition to the components identified herein, there may be other components present in the composition so long as these components do not adversely affect the curing of the composition or the physical properties of the cured composition. Such additional components may be exemplified by, but not limited to, adhesion promoters, fillers, antioxidants, pigments, heat stabilizers and others.

The compositions may be prepared as one part or two part compositions. When the composition is a one part composition, the inhibitor (G) must be present in the composition. When the composition is a two part composition it is not necessary to add the inhibitor (G) to the composition so long as each part does not contain all of the following three components simultaneously: an unsaturated compound (i.e. (A) or (F)); a SiH containing compound (i.e. (B)); and hydrosilylation catalyst (D).

One part compositions are prepared by combining together components (A), (B), (C), (D), (E), and optionally (F). To facilitate combining the components a hydrocarbon solvent such as benzene, toluene, xylene, heptane or heat may be used. If a hydrocarbon solvent is used to facilitate the combining of the components, the solvent is removed from the components by stripping or other known methods. If heat is used it is preferable to heat the components to a temperature of 30° C. to 150° C. However, it should be noted that some inhibitors (G) are activated by heat and thus heat should not be used when there is present in an unsaturated compound (i.e. (A) or (F)), a SiH containing compound (i.e. (B)) and hydrosilylation catalyst (D). Upon the combination of components (A), (B), (C), (D), (E), and optionally (F), the inhibitor (G) is added to the mixture.

The one part compositions should be prepared and maintained in an environment free of oxygen and SiH reactive hydroxylated compounds or heat depending on the inhibitor used to prevent the initiation of the addition cure prior to use. Further the one part compositions should be stored in an environment free of moisture to prevent cure prior to the use of the compositions. Upon exposure to oxygen and moisture the compositions will cure to an adhesive composition that exhibits a high green strength and provides for a movable bond and thereafter further cure to an adhesive that has an immovable bond.

The two part compositions are prepared by combining together the components in two or more parts and then combining together the various parts when use of the composition is desired. The parts may be formulated in any desired manner so long as there is not present in a single part an unsaturated compound (i.e. (A) or (F)), a SiH containing compound (i.e. (B)) and catalyst (D). When the two parts are mixed together curing will begin and the adhesive composition will cure to an adhesive that exhibits a high green strength and provides for a movable bond and thereafter further cure to an adhesive that has an immovable bond. It is preferred to prepare the two part compositions by combining components (A), (B) and optionally (F) in the first part and combining components (A), (C), (D), (E) and optionally (F) in the second part. The two part compositions should be prepared and stored in an environment free of moisture to prevent cure prior to use of the compositions.

To apply the two-part composition, the individual parts are mixed with an appropriate means to obtain a homogeneous mixture at a ratio such that there is present the SiH:Sialkenyl ratio to give the desired physical properties of the cured adhesive.

It is preferable to prepare the compositions as two part compositions. One part compositions may have a very limited storage stability, particularly when the resin contains both an alkenyl group and a curing radical of the formula —ZSiR$^1_x$(OR$_2$)$_{3-x}$.

The compositions are applied to a substrate at room temperature by extruding or by pouring. The surface or substrate to which the adhesive compositions are applied may be any known solid material such as metals, paper, wood, leather, fabrics, plastics, silicones rubbers, concrete, bricks, glass, and others. Following application to the substrate the compositions begin to cure to an adhesive composition that exhibits a high green strength and provides for a movable bond. Because the compositions quickly cures to this state, it is not necessary to heat the compositions to promote curing. Typically, the compositions will reach a tacky state having green strength within minutes of their application. The compositions will continue to cure in the presence of moisture until they are an adhesive that has an immovable bond. This curing can occur within hours to days of application. Heat may be applied to facilitate the last stage of cure, although it is not necessary.

The compositions find utility in many applications now being served by silicone pressure sensitive adhesives, particularly in such industries as automotive, electronic, construction, space and medical. In these of applications, the instant PSAs provide bonds which are resistant to hostile environments, such as heat and moisture.

So that those skilled in the art can understand and appreciate the invention taught herein, the following examples are presented, it being understood that these examples should not be used to limit the scope of this invention found in the claims.

PREPARATION EXAMPLE 1

Preparation of a Resin with a number average molecular weight ($M_n$) of 3000 and a number average vinyl functionality of 1.9.

A 66.9% xylene solution (936.9 g) of a silanol functional MQ resin (~2900 $M_n$) was dried azeotropically at atmospheric pressure. After cooling to 80° C., 44.70 g of 1,3-divinyl-1,1,3,3-tetramethydisilazane and 0.28 g of trifluoroacetic acid were added. The mixture was stirred at 80° C. for 3 hours and 77.82 g of hexamethyldisilazane was added and allowed to react for 8 hours. This was followed by adding 23.17 g of methanol, stirring at 80° C. for one hour, adding 25 g of sodiuim bicarbonate, and stirring while allowing to cool to room temperature. The mixture was stripped to a head temperature of 60° C. at 50 mm Hg to remove any methoxytriorganosilanes and other materials boiling less than xylene, and then filtered to yield a 66% solids solution of the resin in xylene. GPC analysis showed the $M_n$ of 3,000 and $^{29}$Si NMR indicated a SiO$_2$/ROSiO$_{3/2}$/Me$_3$SiO$_{1/2}$/ViMe$_2$SiO$_{1/2}$ ratios of 0.458/0.022/0.475/0.046 which corresponds to a number average vinyl functionality of 1.9.

PREPARATION EXAMPLES 2–7

Preparation of vinyl and alkoxy functional resins from vinylated MQ resins and methyltrimethoxysilane.

300300.0 g of a xylene solution of the vinylated MQ resin having an $M_n$ of 4500 and a number average vinyl functionality ($F_{nvi}$) of 3.1 was azeotropically distilled to remove water. To this was added methyltrimethoxysilane, MTM, (see Table 1) and 0.7 g of 25 % (w/w) of sodium methoxide in methanol, NaOMe. This was heated at 100° C. for 16 hr. The sodium methoxide was neutralized by the addition of 0.6 g of vinyldimethylchlorosilane. The mixture was filtered, stripped to a 135° C. head temperature at atmospheric pressure, and analyzed by GPC and $^{29}$Si NMR. The conditions and results for Preparation Examples 2–7 are in Table 1.

TABLE 1

Formulation and properties of Resins

| Preparation Example | Reactants Wt (g) | | | | Final Product Properties | |
|---|---|---|---|---|---|---|
| | Vi Resin | MTM | NaOMe | ViMe$_2$SiCl | $M_n$ | $F_{nvi}$ |
| 2 | 300 | 13.2 | 0.7 | 0.6 | 4100 | 3.0 |
| 3 | 300 | 26.5 | 0.7 | 0.6 | 3300 | 2.1 |
| 4 | 300 | 39.7 | 0.7 | 0.6 | 2800 | 1.8 |
| 5 | 300 | 52.9 | 0.7 | 0.6 | 2100 | 1.4 |
| 6 | 300 | 66.2 | 0.7 | 0.6 | 1800 | 1.1 |
| 7 | 300 | 132.3 | 0.7 | 0.6 | 1200 | 0.6 |

PREPARATION EXAMPLES 8–10

Preparation of vinyl and alkoxy functional resins from MQ resins, silazanes and methyltrimethoxysilane.

The xylene solution of the resin was dried azeotropically at atmospheric pressure. After cooling to 70° C., 1,3-divinyl-1,1,3,3-tetramethyl disilazane and trifluoroacetic acid were added and allowed to react for 18 h. Methanol was added, allowed to react one hour, and the mixture was stripped to a head temperature of 135° C. After cooling to 99° C., methyltrimethoxysilane, vinyltrimethoxysilane and tetrabutyltitanate were added and allowed to react for 8 hours. The reaction was again striped to a head temperature of 135° C. GPC and $^{29}$Si NMR were used to determine the composition of the resins. Results are in Table 2.

TABLE 2

Formulation and Properties of Resins

| Preparation Example | 8 | 9 | 10 |
|---|---|---|---|
| Starting Resin Mn | 4600 | 2600 | 4600 |
| % Solids | 74.5 | 76.7 | 74.5 |
| Wt Resin Solution | 596 | 503.3 | 508.85 |
| Wt (ViMe$_2$Si)$_2$NH | 17.9 | 15.56 | 0 |
| Wt CF$_3$CO$_2$H | 0.33 | 0.29 | 0 |
| Wt MeOH | 3.09 | 2.69 | 0 |
| Wt MeSi(OMe)$_3$ | 118.34 | 57.16 | 61.08 |
| Wt ViSi(OMe)$_3$ | 0 | 0 | 56.13 |
| Wt Ti(OBu)$_4$ | 2.89 | 2.29 | 2.46 |
| Product Results | | | |
| Product $M_n$ | 4523 | 2780 | 4692 |
| Product $F_{nvi}$ | 1.7 | 0.94 | 3.24 |

EXAMPLE 1

All chemicals were deoxygenated and dried by leaving a bottle open in an atmospheric glove box with <0.1 ppm $O_2$ and <0.5 ppm $H_2O$. All manipulations were carried out inside of this box. A catalyst solution was prepared by dissolving 1.03 g of tributylphosphine oxide in 0.97 g of tetrahydrofuran. To this was added 2.19 g of chloroplatinic acid complex of divinyltetramethyldisiloxane diluted with dimethylvinylsiloxy endblocked polydimethylsiloxane to provide platinum concentration of 4.21 wt % platinum.

A resin stock solution was prepared as follows. To 673.7 g of the resin solution in xylene (Preparation Example 1) was added 181.25 g of a vinyldimethyl terminated polydimethylsiloxane with a viscosity of 55,000 mm$^2$/s and 0.088 weigh percent vinyl. Most of the xylene was removed by heating under vacuum and 9.44 g of a trimethylsiloxy terminated dimethylsiloxy-methylhydrogensiloxy copolymer with viscosity of 5 mm$^2$/s and 0.76 wt % hydrogen bonded to silicon was added. Stripping was completed by heating to 160° C. at 2 mm Hg.

This resin stock was weighed (See Table 3) into small glass jar by heating to 120° C. under air in order that the material could be poured. To these resin stock aliquots was added additional vinyldimethyl terminated polydimethylsiloxane, additional trimethylsiloxy terminated dimethylsiloxy-methylhydrogensiloxy copolymer with viscosity of 5 mm$^2$/s and 0.76 wt % hydrogen bonded to silicon (SiH$^1$), HMe$_2$SiOSiMe$_2$CH2CH$_2$Si(OMe)$_3$ (ETM), titanium (IV) diisopropoxydiethylacetoacetate (TDIDE), and Si(OSiMe$_2$H)$_4$ (SiH$^2$). The blends were mixed with a spatula at 120° C. and placed open in the dry box to remove oxygen. After three days, the platinum catalyst described above was added and mixed in at room temperature to give 100 ppm by weight of platinum. The weights of the components used are given in Table 3.

TABLE 3

Formulations for Examples 1–7.

| Example | Wt Resin Stock g | Wt SiH$^1$ g | Wt SiH$^2$ g | Wt ETM g | Wt Vi Polymer g | Wt Pt g | Wt TDIDE g |
|---|---|---|---|---|---|---|---|
| 1 | 25.65 | 0.43 | 0.00 | 1.65 | 2.08 | 0.12 | 0.07 |
| 2 | 25.13 | 0.42 | 0.00 | 1.62 | 2.04 | 0.12 | 0.15 |
| 3 | 25.68 | 0.03 | 0.23 | 1.66 | 2.24 | 0.12 | 0.07 |
| 4 | 25.39 | 0.42 | 0.24 | 0.82 | 2.63 | 0.12 | 0.07 |
| 5 | 25.23 | 0.42 | 0.24 | 0.82 | 2.62 | 0.12 | 0.15 |
| 6 | 25.62 | 0.24 | 0.40 | 1.48 | 2.03 | 0.12 | 0.15 |
| 7 | 25.61 | 0.24 | 0.83 | 0.83 | 2.25 | 0.12 | 0.15 |

Aluminum lap shear test specimens with an overlap of 1"×1" with a bondline ca. 0.05 mm were prepared, allowed to cure in air, and the adhesive strength periodically determined. Tensile properties of the elastomer samples cured for two week in air were also determined. Results are shown in Table 4.

TABLE 4

Experimental Results Examples 1–7

| Example/ Time | Aluminum Lap Shear (psi) at Time (h) | | | | | | Tensile Properties After Two Weeks | |
|---|---|---|---|---|---|---|---|---|
| | 0.5 | 1 | 2 | 4 | 24 | 48 | Tensile (psi) | Elong (%) |
| 1 | — | 1 | — | — | 45 | 77 | 105 | 207 |
| 2 | — | 2 | — | — | 60 | 95 | 210 | 210 |
| 3 | 0 | 2 | 6 | 14 | 60 | 129 | 113 | 220 |
| 4 | 0 | — | — | — | 94 | 112 | 75 | 355 |
| 5 | 0 | 0 | — | 3 | 55 | 113 | 74 | 433 |
| 6 | 0 | 1 | — | — | 110 | 104 | 146 | 157 |
| 7 | 0 | 1 | — | 5 | 64 | 132 | 57 | 924 |

EXAMPLES 8–13

A resin stock solution was prepared as follows. To 347.0 g of the resin solution (62.6% in xylene) of Preparation Example 5 was added 90.31 g of a vinyldimethyl terminated polydimethylsiloxane with a viscosity of 55,000 mm$^2$/s and 0.088 weigh percent vinyl. The xylene was removed by heating to 160° C. at 2 mm Hg.

This resin stock was weighed (See Table 5) into small glass jar by heating to 120° C. under air in order that the material could be poured. Parts A1 and A2 were prepared by adding to these resin stock aliquots was added, a copolymer comprised of the $SiO_2$ unit and the $HMe_2SiO_{1/2}$ unit with a viscosity of 24 mm²/s and one wt % hydrogen bonded to silicon ($SiH^1$). The blends were mixed with a spatula at 120° C.

Parts B1, B2 and B3 were prepared by adding to the resin stock solution titanium(IV) diisopropoxydiethylacetoacetate (TDIDE), methyltrimethoxysilane (MTM) and chloroplatinic acid complex of divinyltetramethyldisiloxane diluted with dimethylvinylsiloxy endblocked polydimethylsiloxane (4.2 wt % Pt). The blends were mixed with a spatula at 120° C.

The amounts of the components used to prepare Parts A and B is shown in Table 5.

TABLE 5

Part A and B Formulations

| Ref | Wt (g) Stock | Wt SiH¹ g | Wt of Pt g | Wt of MTM g | Wt of TDIDE g |
|---|---|---|---|---|---|
| A1 | 60.28 | 5.40 | | | |
| B1 | 60.03 | | 0.091 | 1.53 | 0.00 |
| B2 | 60.10 | | 0.091 | 1.53 | 0.19 |
| B3 | 60.22 | | 0.091 | 1.54 | 0.38 |
| A2 | 43.40 | 2.60 | | | |

The various part A's and part B's were separately placed into the chambers of a static two-part mixer designed to deliver equal volumes of the two parts. These were applied to two aluminum adherands to make a lap shear test specimen with a 1"×1" overlap area and a 0.05 mm thick bondline. All joints could be repositioned after 30 min. Results are given in Table 6.

TABLE 6

Formulations and Lap Shear Results, Examples 8–13

| | Formulation | | Lap Shear Results (psi) at Time | | | |
|---|---|---|---|---|---|---|
| Example | Part A | Part B | 15 min | 30 min | 2 h | 1 wk |
| 8 | A1 | B1 | 0 | 27 | 109 | 262 |
| 9 | A1 | B2 | 2 | 22 | 62 | 352 |
| 10 | A1 | B3 | 1 | 8 | 11 | 368 |
| 11 | A2 | B1 | 1 | 5 | 99 | 235 |
| 12 | A2 | B2 | 1 | 0 | 1 | NA |
| 13 | A2 | B3 | 0 | 12 | 54 | 232 |

EXAMPLES 14–21

A resin stock solution was prepared as follows. To 481.35 g of the resin solution (81% in xylene) of Preparation Example 9 was added 466.73 g of a toluene solution (49.7%) of a vinyldimethyl terminated polydimethylsiloxane with a viscosity of 55,000 mm²/s and 0.088 weigh percent vinyl. The xylene and toluene were removed by heating to 160° C. at 2 mm Hg.

This material was weighed (See Table 7) into small glass jar by heating to 120° C. under air in order that the material could be poured. Parts A3, A4 and A5 were prepared by adding to these resin stock solution a copolymer comprised of the $SiO_2$ unit and the $HMe_2SiO_{1/2}$ unit with a viscosity of 24 mm²/s and one wt % hydrogen bonded to silicon ($SiH^1$). The blends were mixed with a spatula at 120° C.

Parts B4–8 were prepared by adding to the resin stock solution tetrabutyltitanate (TBT), methyltrimethoxysilane (MTM), chloroplatinic acid complex of divinyltetramethyldisiloxane diluted with dimethylvinylsiloxy endblocked polydimethylsiloxane (4.2 wt % Pt) and a product from the reaction of ethylene glycol and tetraethylorthosilicate (Adhesion Promoter). The blends were mixed with a spatula at 120° C. The amounts of the components used in preparing Part As and Bs are shown in Table 7.

TABLE 7

Part A and B Formulation

| Reference | Resin Stock g | Wt SiH g | Pt g | Adhesion Promoter g | TBT | MTM g |
|---|---|---|---|---|---|---|
| A3 | 80.36 | 7.14 | | | | |
| A4 | 79.6 | 10.61 | | | | |
| A5 | 79.91 | 14.20 | | | | |
| B4 | 20.05 | | 0.04 | 1.30 | 0.05 | 0.22 |
| B5 | 75.19 | | 0.63 | 4.90 | 0.20 | 0.82 |
| B6 | 20.08 | | 0.17 | 1.31 | 0.11 | 0.22 |
| B7 | 40.13 | | 0.68 | 2.63 | 0.00 | 0.44 |
| B8 | 20.06 | | 0.34 | 1.32 | 0.05 | 0.22 |

The various part A's and part B's were separately placed into the chambers of a static two-part mixer designed to deliver equal volumes of the two parts. They were applied to two alumina adherands to make a lap shear test specimen with a 1"×1" overlap area and a 0.05 mm thick bondline. All joints could be repositioned after 30 min. Results are summarized in Table 8.

TABLE 8

Formulations and Lap Shear Results, Examples 14–21

| | | | | Lap Shear Results (psi) at Time | | | | |
|---|---|---|---|---|---|---|---|---|
| Exam- | Formulation | | | 15 | 30 | 2 | 2 | 4 |
| ple | Part A | Part B | TFT | min | min | hours | days | weeks |
| 14 | A5 | B5 | <5 | 76 | 121 | 153 | 111 | 101 |
| 15 | A5 | B7 | 2 | 70 | 119 | 62 | 127 | 359 |
| 16 | A4 | B6 | 4 | 25 | 48 | 101 | 170 | 239 |
| 17 | A4 | B5 | 5 | 83 | 28 | 67 | 148 | 254 |
| 18 | A3 | B7 | NA | 87 | 74 | 107 | 200 | 435 |
| 19 | A4 | B4 | 25 | 105 | 82 | 119 | 172 | 394 |
| 20 | A4 | B8 | NA | 85 | 60 | 72 | 115 | 343 |
| 21 | A3 | B5 | NA | 74 | 107 | 96 | 182 | 419 |

COMPARATIVE EXAMPLES 1–3

A resin stock solution was prepared as follows: To 240.0 g of a resin solution (79.4% solids, Mn=2600, M/Q–0.9) was added 81.6 g of vinyldimethysiloxy terminated polydimethylsiloxane with a viscosity of 55,000 mm²/s and 0.088 wt % vinyl. The xylene was removed by heating to 140° C. at 0.5 mm Hg.

This resin stock was weighed (See Table 9) into small glass jar by heating to 120° C. under air in order that the material could be poured. To these resin stock aliquots was added additional vinyldimethysiloxy terminated polydimethylsiloxane, a copolymer comprised of the $SiO_2$ unit and the $HMe_2SiO_{1/2}$ unit with a viscosity of 24 mm²/s and one wt % hydrogen bonded to silicon ($SiH^1$), titanium (IV) tetrabutoxide (TBT), vinyl- or 1-hexenyltrimethoxysilane and/or a chloroplatinic acid complex of divinyltetramethyldisiloxanediluted with dimethylvinylsiloxy endblocked polydimethylsiloxane (4.2 wt % Pt). The blends were mixed with a spatula at 120° C. and placed open in the dry box to remove oxygen. The weights of the components used are given in Table 9.

The various part A's and part B's (A1/B1, A2/B2/A3/B3) were separately placed into the chambers of a static two-part mixer designed to deliver equal volumes of the two parts. None of the adhesives cured, either to a PSA nor a non-movable state.

TABLE 9

Two Part Formulations for Comparative Example 1–3

| Reference | Stock (g) | SiH$^1$ (g) | Polymer (g) | Pt (g) | HTM (g) | VTM (g) | TBT (g) |
|---|---|---|---|---|---|---|---|
| A1 | 25.00 | 0.00 | 2.67 | 0.035 | 0.00 | 1.17 | 0.29 |
| B1 | 25.00 | 1.28 | 2.88 | 0.000 | 0.00 | 0.00 | 0.00 |
| A2 | 25.00 | 0.00 | 1.51 | 0.035 | 0.00 | 2.33 | 0.29 |
| B2 | 25.00 | 2.45 | 1.71 | 0.000 | 0.00 | 0.00 | 0.00 |
| A3 | 25.00 | 0.00 | 2.82 | 0.035 | 1.17 | 0.00 | 0.29 |
| B3 | 25.00 | 1.28 | 2.86 | 0.000 | 0.00 | 0.00 | 0.00 |

What is claimed is:

1. A silicone adhesive composition comprising a mixture of (A) 40 to 95 parts of an alkenyl functional siloxane resin consisting essentially of $R_3SiO_{1/2}$ siloxane units and $SiO_{4/2}$ siloxane units wherein each R is selected from the group consisting of a monovalent hydrocarbon radical having 1 to 6 carbon atom and $—ZSiR^1_x(OR^2)_{3-x}$ with the provision that at least one R is an alkenyl radical; there being from 0.5 to 1.5 $R_3SiO_{1/2}$ units for every $SiO_{4/2}$ units; said resin containing 0.01 to 22 wt % alkenyl functionality;

(B) 0.5 to 20 parts of a SiH containing polyorganosiloxane having an average of at least 1.7 silicon-bonded hydrogen atoms per molecule and having a viscosity of 0.8 to 2,000 mm$^2$/s;

(C) a silane represented by monomers of the formula $R^1_{4-y}Si(OR^2)_y$, or oligomeric reaction products of partial hydrolysis and condensation thereof, in which $R^1$ is selected from the group consisting of alkyl radicals having 1–6 carbon atoms and aryl radicals having 6–10 carbon atoms, $R^2$ is selected from the group consisting of an alkyl radical having 1 to 3 carbon atoms and an alkoxyalkyl radical; and y is 2 to 4;

(D) a hydrosilylation catalyst in sufficient quantity to promote curing of said composition; and (E) a moisture curing catalyst to promote the moisture iniated cure of the alkoxy radicals wherein at least one of said resin (A), or SiH containing polyorganosiloxane (B) contain a curing radical of the formula $—ZSiR^1_x(OR^2)_{3-x}$; wherein $R^1$ is as described previously; $R^2$ is selected from the group consisting of an alkyl radical having 1 to 3 carbon atoms and an alkoxyalkyl radical; Z is a divalent linking radical; and the x has a value of 0 or 1;

wherein said adhesive composition has a viscosity of between 5 and 1,500 Pa's at 25° C. in the absence of solvent; and wherein said adhesive composition first cures to a composition having green strength and a movable bond and thereafter further cures to a composition having an immovable bond.

2. A silicone adhesive composition comprising a mixture of (A) 40 to 95 parts of an alkenyl functional siloxane resin consisting essentially of $R_3SiO_{1/2}$ siloxane units and $SiO_{4/2}$ siloxane units wherein each R is selected from the group consisting of a monovalent hydrocarbon radical having 1 to 6 carbon atom and $—ZSiR^1_x(OR^2)_{3-x}$ with the provision that at least one R is an alkenyl radical; there being from 0.5 to 1.5 $R_3SiO_{1/2}$ units for every $SiO_{4/2}$ units; said resin containing 0.01 to 22 wt % alkenyl functionality;

(B) 0.5 to 20 parts of a SiH containing polyorganosiloxane having an average of at least 1.7 silicon-bonded hydrogen atoms per molecule and having a viscosity of 0.8 to 2,000 mm$^2$/s;

(C) a silane represented by monomers of the formula $R^1_{4-y}Si(OR^2)_y$, or oligomeric reaction products of partial hydrolysis and condensation thereof, in which $R^1$ is selected from the group consisting of alkyl radicals having 1–6 carbon atoms and aryl radicals having 6–10 carbon atoms, $R^2$ is selected from the group consisting of an alkyl radical having 1 to 3 carbon atoms and an alkoxyalkyl radical; and y is 2 to 4;

(D) a hydrosilylation catalyst in sufficient quantity to promote curing of said composition;

(E) a moisture curing catalyst to promote the moisture iniated cure of the alkoxy radicals; and (F) 0.1 to 50 parts of a polydiorganosiloxane having at least two ethylenically or acetylenicaly unsaturated groups per molecule and having a viscosity of 100 to 80,000 mm$^2$/s wherein at least one of said resin (A), SiH containing polyorganosiloxane (B) or polydiorganosiloxane (F) contain a curing radical of the formula $—ZSiR^1_x(OR^2)_{3-x}$; wherein $R^1$ is as described previously; $R^2$ is selected from the group consisting of an alkyl radical having 1 to 3 carbon atoms and an alkoxyalkyl radical; Z is a divalent linking radical; and the x has a value of 0 or 1;

wherein said adhesive composition has a viscosity of between 5 and 1,500 Pa's at 25° C. in the absence of solvent; and wherein said adhesive composition first cures to a composition having green strength and a movable bond and thereafter further cures to a composition having an immovable bond.

3. The composition as claimed in claim 1 wherein there is additionally an hydrosilylation catalyst inhibitor (G) in sufficient quantity for the composition to be stable at room temperature.

4. The composition as claimed in claim 1 wherein resin (A) contains from 0.6 to 8 wt % alkenyl functionality.

5. The composition as claimed in claim 1 wherein in resin (A) the alkenyl functionality is vinyl and the remaining R groups are methyl.

6. The composition as claimed in claim 1 wherein in resin (A) there is from 0.6 to 1.1 $R_3SiO_{1/2}$ siloxane units to each $SiO_{4/2}$ units.

7. The composition as claimed in claim 1 where the viscosity of the SiH containing polyorganosiloxane (B) is from 2 to 200 mm$^2$/s.

8. The composition as claimed in claim 1 wherein the SiH containing polyorganosiloxane (B) is selected from the group consisting of

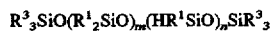

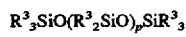

wherein each $R^1$ individually is a radical selected from the group consisting of alkyl radicals having from 1 to 6 carbon atoms and aryl radicals having from 6 to 10 carbons atoms; $R^3$ is selected from the group consisting of the hydrogen atom and $R^1$ with the proviso that at least 1.7 $R^3$ is group is a hydrogen atom; m, n, p, s, t, a, b, and c are such that the viscosity is from 0.8 to 2.000 mm²/s and that, individually, n, p, t and a+c are $\geq 1.7$.

9. The composition as claimed in claim 1 wherein the silane (C) is methyltrimethoxysilane.

10. The composition as claimed in claim 1 wherein the hydrosilylation catalyst (D) is a platinum-containing catalyst.

11. The composition as claimed in claim 10 wherein the hydrosilylation catalyst is present in an amount to provide from 0.1 to 1000 ppm of platinum.

12. The composition as claimed in claim 1 wherein the moisture curing catalyst (E) is selected from the group consisting of metal salts of monocarboxylic acids; titanium esters; siloxytitanates; betadicarbonyltitanium compounds; amines; amine acetates and quaternary salts of amines.

13. The composition as claimed in claim 1 wherein the moisture curing catalyst is titanium diisopropoxydiethylacetoacetate.

14. The composition as claimed in claim 1 wherein the moisture curing catalyst is tetrabutyltitanate.

15. The composition as claimed in claim 1 wherein the moisture curing catalyst is present in an amount of 0.5 to 10 wt %.

16. The composition as claimed in claim 2 wherein the polydiorganosiloxane has the general formula $R^1{}_2R^4SiO(R^4{}_2SiO)_kSiR^4R^1{}_2$ wherein each $R^1$ is individually a radical selected from the group consisting of alkyl radicals having from 1 to 6 carbon atoms and aryl radicals having from 6 to 10 carbons atoms; each $R^4$ individually is selected from the group consisting of an alkenyl radical, an alkynyl radical and $R^1$ with the proviso that at least two $R^4$ radicals per molecule must be alkenyl or alkynyl; and k has a value such that the viscosity of polydiorganosiloxane (F) is from 100 to 80,000 mm²/s at 25° C.

17. The composition as claimed in claim 16 wherein the viscosity of polydiorganosiloxane (F) is from 9,000 to 55,000 mm²/s.

18. The composition as claimed in claim 16 wherein $R^1$ is methyl.

19. The composition as claimed in claim 2 wherein there is from 8 to 40 parts of the polydiorganosiloxane (F).

20. The composition as claimed in claim 3 wherein the hydrosilylation catalyst inhibitor is selected from the group consisting of organophosphorus compounds; nitrogenous compounds; sulfur-containing compounds; acetylenic compounds; compounds bearing at least two alkenyl groups; hydroperoxy compounds; and maleic acid derivatives.

21. The composition as claimed in claim 20 wherein the hydrosilylation catalyst inhibitor is an organophosphorus compound.

22. The composition as claimed in claim 3 wherein the hydrosilylation catalyst inhibitor is present in an amount to provide a mole ratio of inhibitor to metal in the hydrosilylation catalyst of 1:1 to 200:1.

23. A one part addition-curable silicone adhesive composition comprising a mixture of (A) 40 to 95 parts of an alkenyl functional siloxane resin consisting essentially of $R_3SiO_{1/2}$ siloxane units and $SiO_{4/2}$ siloxane units wherein each R is independently a monovalent hydrocarbon radical having 1 to 6 carbon atoms with the provision that at least one R is an alkenyl radical; there being from 0.5 to 1.5 $R_3SiO_{1/2}$ units for every $SiO_{4/2}$ units; said resin containing 0.01 to 22 wt % alkenyl functionality;

(B) 0.5 to 20 parts of a SiH containing polyorganosiloxane having an average of at least 1.7 silicon-bonded hydrogen atoms per molecule and having a viscosity of 0.8 to 2,000 mm²/s;

(C) a silane of the formula $R^1{}_{4-y}Si(OR^2)_y$ or oligomeric reaction products of partial hydrolysis or condensation thereof, in which $R^1$ is selected from the group consisting of alkyl radicals having 1–6 carbon atoms and aryl radicals having 6–10 carbon atoms, $R^2$ is selected from the group consisting of an alkyl radical having 1 to 3 carbon atoms and an alkoxyalkyl radical; and y is 2 to 4;

(D) a hydrosilylation catalyst in sufficient quantity to promote curing of said composition;

(E) a moisture curing catalyst to promote the moisture iniated cure of the alkoxy radicals;

(F) 0.1 to 50 parts of a polydiorganosiloxane having at least two ethylenically or acetylenicaly unsaturated groups per molecule and having a viscosity of 100 to 80.000 mm²/s; and (G) a hydrosilylation catalyst inhibitor in sufficient quantity for the composition to be stable at room temperature;

wherein at least one of said resin (A), or SiH containing polyorganosiloxane (B) or polydiorganosiloxane (F) contain a curing radical of the formula $-ZSiR^1{}_x(OR^2)_{3-x}$; wherein $R^1$ is as described previously; $R^2$ is selected from the group consisting of an alkyl radical having 1 to 3 carbon atoms and an alkoxyalkyl radical; Z is a divalent linking radical; and the x has a value of 0 or 1;

wherein said adhesive composition has a viscosity of between 5 and 1,500 Pa's 25° C. in the absence of solvent; and wherein said adhesive composition first cures to a composition having green strength and a movable bond and thereafter further cures to a composition having an immovable bond.

24. A two part addition-curable silicone adhesive composition comprising (A) 40 to 95 parts of an alkenyl functional siloxane resin consisting essentially of $R_3SiO_{1/2}$ siloxane units and $SiO_{4/2}$ siloxane units wherein each R is independently a monovalent hydrocarbon radical having 1 to 6 carbon atoms with the provision that at least one R is an alkenyl radical; there being from 0.5 to 1.5 $R_3SiO_{1/2}$ units for every $SiO_{4/2}$ units; said resin containing 0.01 to 22 wt % alkenyl functionality;

(B) 0.5 to 20 parts of a SiH containing polyorganosiloxane having an average of at least 1.7 silicon-bonded hydrogen atoms per molecule and having a viscosity of 0.8 to 2,000 mm²/s;

(C) a silane of the formula $R^1{}_{4-y}Si(OR^2)_y$ or oligomeric reaction products of partial hydrolysis and condensation thereof, in which $R^1$ is selected from the group consisting of alkyl radicals having 1–6 carbon atoms and aryl radicals having 6–10 carbon atoms, $R^2$ is selected from the group consisting of an alkyl radical having 1 to 3 carbon atoms and an alkoxyalkyl radical; and y is 2 to 4;

(D) a hydrosilylation catalyst in sufficient quantity to promote curing of said composition;

(E) a moisture curing catalyst to promote the moisture iniated cure of the alkoxy radicals;

(F) 0.1 to 50 parts of a polydiorganosiloxane having at least two ethylenically or acetylenicaly unsaturated groups per molecule and having a viscosity of 100 to 80,000 mm$^2$/s; and wherein at least one of said resin (A), or SiH containing polyorganosiloxane (B) or polydiorganosiloxane (F) contain a curing radical of the formula —ZSiR$^1_x$(OR$^2$)$_{3-x}$; wherein R$^1$ is as described previously; R$^2$ is selected from the group consisting of an alkyl radical having 1 to 3 carbon atoms and an alkoxyalkyl radical; Z is a divalent linking radical; and the x has a value of 0 or 1;

wherein the first part comprises components (A), (B) and (F) and the second part comprises (A), (C), (D), (E) and (F);

wherein said adhesive composition has a viscosity of between 5 and 1,500 Pa's 25° C. in the absence of solvent; and wherein said adhesive composition first cures to a composition having green strength and a movable bond and thereafter further cures to a composition having an immovable bond.

* * * * *